Patented Oct. 22, 1940

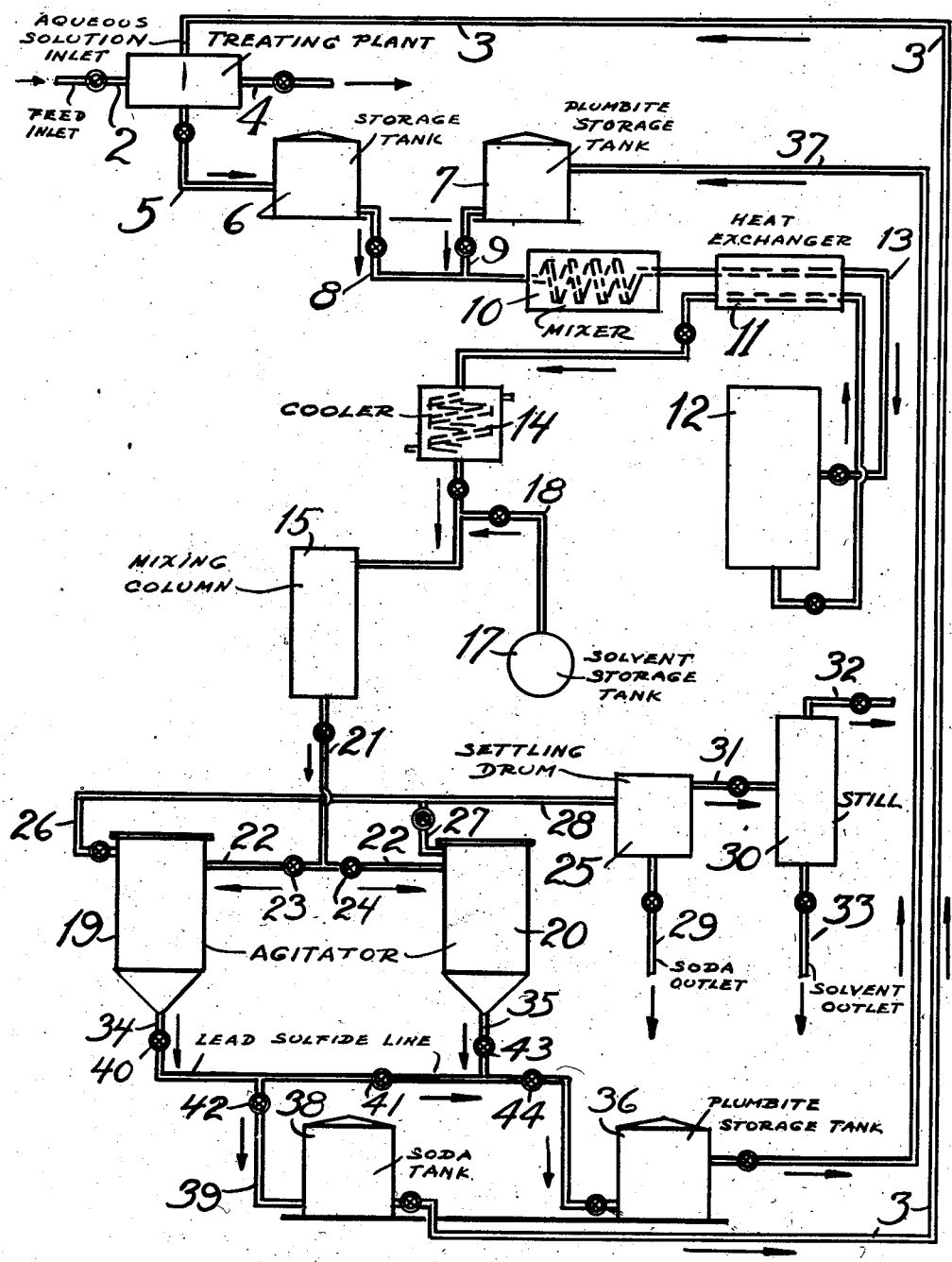

2,218,610

UNITED STATES PATENT OFFICE 2,218,610

REFINING PROCESS

Amiot P. Hewlett, Summit, N. J., assignor to Standard Oil Development Company, a corporation of Delaware Application September 30, 1939, Serial No. 297,244

12 Claims. (Cl. 260—609)

The present invention relates to an improvement in the regeneration of spent alkaline solutions used in the refining of petroleum products and to the recovery of valuable by-products. The invention is particularly concerned with the regeneration of alkali metal hydroxide solutions containing mercaptides secured in the refining of petroleum oils. In accordance with the present process, the spent alkaline solutions are regenerated and valuable thio-ether compounds produced in one operation by treating said spent alkaline solutions with a plumbite solution.

It is known in the art to treat mineral oils, particularly petroleum oils boiling in the motor fuel boiling range, with various alkaline solutions. The alkaline solution generally employed is an aqueous solution of sodium hydroxide. The oil and the solution of sodium hydroxide are contacted under suitable conditions adapted to secure adequate mixing of the oil and the solution of sodium hydroxide. The treated or sweetened oil is removed from the spent alkaline solution which is usually regenerated by steaming or by blowing with air or other suitable gas at elevated temperatures. This latter operation converts the mercaptides to mercaptans which are removed overhead and usually utilized as fuel.

I have now discovered a process by which it is possible to regenerate the spent alkaline solution and convert the contained mercaptans to thio-ether compounds in one operation. In accordance with the present process, this is accomplished by treating the spent alkaline solution with a sodium plumbite solution. The reactions may be illustrated as follows:

2NaOH+2RSH⟶2RSNa+2H₂O

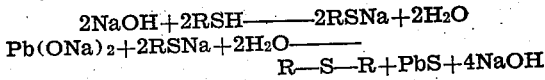

The process of my invention may be readily understood by reference to the attached drawing illustrating one modification of the same. Feed oil which for the purpose of description is taken to be a petroleum oil boiling in the motor fuel boiling range is introduced into treating plant 1 by means of feed line 2. In treating plant 1, the oil is contacted with an alkoline solution which is introduced by means of feed line 3. For the purpose of description, it is assumed that the alkaline solution is an aqueous solution of sodium hydroxide. Temperature and pressure conditions are maintained on treating plant 1 to convert the undesirable mercaptans to corresponding mercaptides. It is to be understood that the treating plant may comprise any suitable number or any desired arrangement of treating units. The treated petroleum oil, substantially free of undesirable mercaptans, is removed from treating plant 1 by means of line 4 while the spent sodium hydroxide solution containing the removed mercaptans as mercaptides is withdrawn by means of line 5 and passed into storage tank 6. The spent sodium hydroxide solution is withdrawn from storage tank 6 by means of line 8 and mixed with a sodium plumbite or doctor solution which is withdrawn from storage tank 7 by means of line 9. The mixture passes through mixer 10, through heat exchanger 11, and then is passed into reactor or still 12 by means of line 13. The mixture is heated in reactor 12 under conditions adapted for the formation of lead sulfide and thio-ethers. Reactor 12 is provided with suitable heating means in order to secure the desired temperature. Pressure may be held on this reactor if desired. In reactor 12, the sodium mercaptides are decomposed and the sodium hydroxide solution regenerated with the formation of lead sulfide and thio-ethers. The mixture of regenerated caustic soda, lead sulfide, and thio-ethers is passed from reactor 12 through heat exchanger 11, through cooler 14, and into orifice mixing column 15. Prior to introducing the mixture into orifice mixing column 15, a suitable solvent is withdrawn from solvent storage tank 17 and introduced into said mixture by means of line 18. The mixture is then allowed to pass alternately into agitators 19 and 20 by means of line 21, 22, and 23, respectively. The desired control of flow is secured by adjusting valves 23 and 24. Phase formations occur in the respective agitators, resulting in the formation of a solvent phase containing thio-ethers, a regenerated sodium hydroxide phase, and a precipitated lead sulfate phase. The solvent phase containing the thio-ethers is removed from agitators 19 and 20 by means of lines 26 and 27 respectively and introduced into settling drum 25 by means of line 28. Complete removal of the regenerated soda from the solvent and thio-ethers is secured by withdrawing any entrained soda from the settling drum 25 by means of line 29. The solvent and thio-ethers are removed from settling drum 25 and introduced into still 30 by means of line 31. Temperature and pressure conditions are maintained on still 30 in order to separate the solvent from the thio-ethers. The thio-ethers are removed from still 30 by means of line 32 while the solvent is removed by means of line 33. The lead sulfide which settles at the bottom of the respective agitators 19 and 20 is removed by means of line 34 and 35 and passed into tank 36 together with sufficient sodium hydroxide from agitators 19 and 20 to secure complete regeneration of the plumbite solution. The regenerated sodium plumbite solution is recycled to sodium plumbite storage 7 by means of line 37. The remaining sodium hydroxide solution withdrawn from agitators 19 and 20 is passed into sodium hydroxide storage 38 by means of line 39.

The process of the present invention may be widely varied. Although the invention may be utilized for the production of thio-ethers and the regeneration of spent alkaline solutions secured in the removal of mercaptan compounds from any mineral oil by means of an alkaline solution, it is particularly adapted for the production of these thio-ethers from so-called stabilizer bottoms cut. This petroleum fraction comprises cracked petroleum naphthas boiling in the range from about 10° F. to 200° F. and comprises essentially butanes, pentanes, hexanes, and heptanes. This fraction is usually of sufficiently low sulfur content after treatment with said alkaline solution so as to by-pass subsequent sulfuric acid or equivalent acid treatment.

The temperatures and pressures employed for the removal of the mercaptan compounds from the feed oils will vary depending upon the particular feed oil, the type and character of mercaptan compounds present, as well as upon the particular alkaline solution used. However, in general it is preferred to employ temperatures below 100° F. Preferred pressures are in the range from 75 to 125 pounds per square inch while preferred temperatures are in the range from 30 to 60° F. Care should be exercised so that no appreciable increase in the temperature of the spent alkaline solution occurs until after the plumbite solution has been added.

Although any suitable alkaline solution may be used, the invention is particularly directed to the regeneration of alkali metal hydroxide solutions and to the production of thio-ethers from spent solutions of the same. The invention is especially adapted for the processing of aqueous solutions of sodium hydroxide utilized in the treatment of mercaptans contained in petroleum oils boiling in the motor fuel boiling range. Petroleum oils boiling in this range are treated with various amounts of sodium hydroxide solution of various concentrations, depending upon the character of the oil being treated, the concentration and the character of mercaptan compounds present, as well as upon the yield and quality of products desired. Usually, if the petroleum oil contains from 0.01% to 0.10% of mercaptan sulfur, the oil is treated with from 10% to 20% by volume of 15° Baumé sodium hydroxide. The spent sodium hydroxide solution containing mercaptides after separation from the feed oil is then mixed with a sodium plumbite solution. The amount of sodium plumbite solution added should be sufficient to remove the excess sulfur as lead sulfide. While sodium plumbite solutions having a wide range of lead concentration are satisfactory we have found that it is desirable to use a sodium plumbite solution which is characterized by having 0.15 to 0.210 lb. of lead per gallon of 15° Baumé sodium hydroxide solution. Under certain operating conditions, a slight excess of sodium plumbite may be added above the minimum amount which may, in certain cases, be as high as 20% above the theoretical quantity.

The mixture comprising spent alkaline solution containing mercaptides and the added plumbite solution is then raised to reaction temperature in the range between about 200° F. to 500° F. In general, it is preferred that the temperature be in the range above 400° F. Pressures likewise may vary over a wide range depending upon the particular temperature employed. The reaction time is sufficient so that complete regeneration of the alkaline solution is secured. The reaction mixture after removal from the reaction chamber is cooled to atmospheric temperature and pressure and then preferably mixed with the selective solvent.

Suitable solvents are benzene, acetone, propane, butane, various petroleum fractions and the like. The preferred solvents, however, are butane and narrow boiling highly paraffinic petroleum naphthas. The volume of solvent used will vary widely depending upon the particular solvent used, the oil being treated, and the concentration of sulfur compounds present. In general, it is preferred to use from one half to four volumes of solvent per volume of reaction mixture being extracted. Since sulfur compounds act as ignition promoters for Diesel fuels a very desirable modification of the present invention is to extract the reaction products with a Diesel fuel. Under certain operations, it may be desirable to separate the thio-ethers from the reaction mixture by stratification in the absence of a solvent. The thio-ethers would then be separated in a crude condition as a top layer in the agitators and purified by known means.

The process of my invention is not to be limited by any theory or mode of operation, but only by the following claims in which it is desired to claim all novelty insofar as the prior art permits.

I claim:

1. Process for the regeneration of spent alkaline solution secured in the removal of mercaptan compounds from mineral oil comprising mixing with said spent alkaline solution a quantity of an alkali metal plumbite solution, heating said mixture to a temperature to completely decompose the mercaptides, cooling the mixture and separating the regenerated alkaline solution.

2. Process in accordance with claim 1 in which said mixture is heated to a temperature in the range from about 200° F. to 500° F.

3. Process for the regeneration of spent alkali metal hydroxide solution secured in the removal of mercaptan compounds from mineral oil comprising mixing with said spent alkali metal hydroxide solution a quantity of sodium plumbite, heating the mixture to completely decompose the mercaptides, cooling the mixture and separating the regenerated alkali metal hydroxide solution.

4. Process in accordance with claim 3 in which said alkali metal hydroxide solution is an aqueous solution of sodium hydroxide.

5. Process in accordance with claim 3 in which said alkali metal hydroxide solution is a sodium hydroxide solution and in which the mixture is heated to a temperature in the range from about 200° F. to 500° F.

6. Process for the regeneration of spent alkaline solution secured in the removal of mercaptan compounds from mineral oil and for the production of thio-ether compounds in one operation comprising mixing with said spent alkaline solution a quantity of an alkali metal plumbite solution, heating said mixture to a temperature to completely decompose the mercaptides, cooling the mixture and separating the regenerated alkaline solution and the resulting thio-ether compounds.

7. Process in accordance with claim 6 in which said thio-ether compounds are separated by means of a selective solvent having a preferential selectivity for said thio-ether compounds.

8. Process for the regeneration of spent sodium hydroxide solution secured in the removal of mercaptan compounds from petroleum oils boiling in the motor fuel boiling range comprising mixing with said spent sodium hydroxide solution a quantity of sodium plumbite, heating the mixture to completely decompose the mercaptides, cooling the mixture and separating the regenerated sodium hydroxide solution.

9. Process for the regeneration of spent sodium hydroxide solution secured in the removal of mercaptan compounds from petroleum oils boiling in the motor fuel boiling range and for the simultaneous production of thio-ether compounds comprising mixing with said spent sodium hydroxide solution a sodium hydroxide solution of sodium plumbite, heating the mixture to completely decompose the mercaptides, whereby thio-ether compounds are formed, cooling the mixture and separating the regenerated sodium hydroxide solution and the thio-ether compounds.

10. Process in accordance with claim 9 in which said thio-ether compounds are separated by the addition of a solvent having a preferential selectivity for said thio-ether compounds.

11. Process for the production of thio-ether compounds from mercaptan containing petroleum oil boiling in the motor fuel boiling range comprising contacting said petroleum oil with an aqeous solution of sodium hydroxide under conditions to convert the mercaptans to corresponding mercaptides, separating the spent sodium hydroxide solution containing said mercaptides from the treated oil, mixing with said spent sodium hydroxide solution a sodium hydroxide solution of sodium plumbite, heating said mixture to a temperature to completely decompose the mercaptides, whereby thio-ether compounds are formed, cooling the mixture and separating said thio-ether compounds and the regenerated sodium hydroxide solution.

12. Process in accordance with claim 11 in which said thio-ether compounds are separated from the regenerated sodium hydroxide solution by means of a selective solvent having a preferential selectivity for said thio-ether compounds.

AMIOT P. HEWLETT.